United States Patent
Yeo (10) Patent No.: US 9,426,744 B2
(45) Date of Patent: *Aug. 23, 2016

(54) APPARATUS AND METHOD FOR REDUCING POWER CONSUMPTION IN PORTABLE TERMINAL

(71) Applicant: Samsung Electronics Co., Ltd, Gyeonggi-do (KR)

(72) Inventor: Jae-Yung Yeo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,280

(22) Filed: Jul. 13, 2015

(65) Prior Publication Data

US 2015/0319697 A1 Nov. 5, 2015

Related U.S. Application Data

(63) Continuation of application No. 13/326,217, filed on Dec. 14, 2011, now Pat. No. 9,084,196.

(30) Foreign Application Priority Data

Dec. 22, 2010 (KR) .................... 10-2010-0132135

(51) Int. Cl.
| | |
|---|---|
| H04W 52/00 | (2009.01) |
| H04W 52/02 | (2009.01) |
| H04W 88/02 | (2009.01) |
| H04W 88/08 | (2009.01) |
| H04W 84/12 | (2009.01) |

(52) U.S. Cl.
CPC .......... *H04W 52/0229* (2013.01); *H04W 84/12* (2013.01); *H04W 88/02* (2013.01); *H04W 88/08* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 7,768,982 | B2 * | 8/2010 | Zhang ................... | H04W 48/16 370/252 |
| 8,078,165 | B2 * | 12/2011 | Mate ...................... | C03C 17/09 455/404.2 |
| 9,084,196 | B2 * | 7/2015 | Yeo .................... | H04W 52/0229 |
| 2006/0063560 | A1 | 3/2006 | Herle | |
| 2007/0060130 | A1 | 3/2007 | Gogic et al. | |
| 2008/0176583 | A1 | 7/2008 | Brachet et al. | |
| 2008/0293404 | A1 | 11/2008 | Scherzer et al. | |
| 2010/0056181 | A1 | 3/2010 | Rippon et al. | |
| 2011/0286437 | A1 | 11/2011 | Austin et al. | |
| 2012/0163260 | A1 | 6/2012 | Yeo | |
| 2012/0230305 | A1 | 9/2012 | Barbu et al. | |

* cited by examiner

*Primary Examiner* — Benjamin H Elliot, IV (57) ABSTRACT

An apparatus and method minimize power consumption in a portable terminal which enters a low-power mode during connection with an access point (AP). The apparatus includes a memory for storing a Wi-Fi profile including position information of APs, a wireless LAN module for performing connection with the AP, an AP connection unit for performing connection with the AP using the wireless LAN module only when an AP exists around the portable terminal, a position determining unit for determining APs which exist around the portable terminal, and a controller configured to determine a position of the portable terminal, determine a position of an AP which exists around the portable terminal, and operate the wireless LAN module at only a position where the AP exists.

20 Claims, 5 Drawing Sheets

APPARATUS AND METHOD FOR REDUCING POWER CONSUMPTION IN PORTABLE TERMINAL

CROSS-REFERENCE TO RELATED APPLICATION AND CLAIM OF PRIORITY

The present application is a continuation of U.S. Non-Provisional patent application Ser. No. 13/326,217 filed Dec. 14, 2011, which is related to and claims the benefit under 35 U.S.C. §119(a) of a Korean patent application filed in the Korean Intellectual Property Office on Dec. 22, 2010 and assigned Serial No. 10-2010-0132135, the entire disclosure of which is hereby incorporated by reference.

TECHNICAL FIELD OF THE INVENTION

The present disclosure relates to an apparatus and method for reducing power consumption of a portable terminal. More particularly, the present disclosure relates to an apparatus and method for minimizing power consumption in a portable terminal which enters a low-power mode during connection with an Access Point (AP).

BACKGROUND OF THE INVENTION

Portable terminals have become necessities of modern life for people of all ages. Thus, service providers and terminal manufacturers are competitively developing differentiated products and services.

For example, the portable terminal has developed into a multimedia device capable of providing various services such as a phonebook service, a game service, a Short Message Service (SMS), an electronic mail (e-mail) service, a wake-up call service, an MPEG-1 Audio Layer 3 (MP3) service, a scheduling service, a digital camera service, a Multimedia Message Service (MMS), and a wireless Internet service.

In order to use a packet data service including the multimedia message service and the wireless Internet service, the aforementioned portable terminal may need to perform connection with an AP of the corresponding service.

That is, the portable terminal uses the packet data service by transmitting data to the AP. The portable terminal cannot use the packet data service in environments where the AP does not exist.

In accordance with use of a battery with limited capacity, if the aforementioned portable terminal does not operate during a certain time, it enters a power save mode to increase a usage time thereof.

Also, although the portable terminal enters the power save mode, it operates a Wi-Fi module to periodically transmit signals for searching APs.

That is, a hardware module of the portable terminal is changed to a sleep state by the power save mode. Because current is consumed in units of several tens of milli-amperes when the portable terminal maintains the Wi-Fi module compulsorily in a wakeup state during a certain time, a usage time of the portable terminal is shortened.

Therefore, an apparatus and method for minimizing power consumption in a portable terminal which enters a sleep mode is needed.

SUMMARY OF THE INVENTION

To address the above-discussed deficiencies of the prior art, it is a primary object to provide at least the advantages described below. Accordingly, an aspect of the present disclosure is to provide an apparatus and method for minimizing power consumption of a portable terminal which enters a power save mode in an access point search process.

Another aspect of the present disclosure is to provide an apparatus and method for waking a Wi-Fi module up at only a position where an AP exists in a portable terminal.

Another aspect of the present disclosure is to provide an apparatus and method for ending an operation of a Wi-Fi module at a position where an AP does not exist in a portable terminal.

Another aspect of the present disclosure is to provide an apparatus and method for writing a Wi-Fi profile including position information of searched APs when searching the APs.

In accordance with an aspect of the present disclosure, an apparatus for reducing power consumption in a portable terminal is provided. The apparatus includes a memory configured to store a Wi-Fi profile including position information of one or more APs. The apparatus also includes a wireless Local Area Network (LAN) module configured to perform connection with an AP. The apparatus further includes an AP connection unit configured to perform connection with the AP using the wireless LAN module only when the AP exists around the portable terminal. The apparatus still further includes a position determining unit configured to determine APs which exist around the portable terminal. The apparatus also includes a controller configured to determine a position of the portable terminal, determine a position of an AP which exists around the portable terminal, and operate the wireless LAN module only at the position where the AP exists.

In accordance with another aspect of the present disclosure, a method of reducing power consumption in a portable terminal is provided. The method includes storing a Wi-Fi profile including position information of APs, determining a position of the portable terminal, determining whether an AP exists around the portable terminal, operating a wireless LAN module at a position where the AP exists, and performing connection with the AP using the wireless LAN module.

In accordance with yet another aspect of the present disclosure, a mobile terminal for reducing power consumption includes a memory configured to store first information containing at least one position information of at least one AP, a wireless LAN module configured to perform a connection with an AP, and a controller configured to determine whether the mobile terminal is currently positioned within a coverage of the stored at least one position information by comparing a current location of the mobile terminal with the stored at least one position information, inactivate the wireless LAN module if the controller determines that the mobile terminal is currently positioned outside the coverage, and activate the wireless LAN module if the controller determines that the mobile terminal is currently positioned outside the coverage and the connection with the at least one AP is maintained.

In accordance with another aspect of the present disclosure, a method of reducing power consumption in a mobile terminal includes storing first information containing at least one position information of at least one AP, determining whether the mobile terminal is currently positioned within a coverage of the stored at least one position information by comparing a current location of the mobile terminal with the stored at least one position information, inactivating the wireless LAN module if the controller determines that the mobile terminal is currently positioned outside the coverage, and activating the wireless LAN module if the controller determines that the mobile terminal is currently positioned outside the coverage and the connection with the at least one AP is maintained.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following detailed description taken in conjunction with the accompanying drawings, in which.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure.

Exemplary embodiments of the present disclosure will be described herein below with reference to the accompanying drawings. In the following description, well-known functions or constructions are not described in detail since they would obscure the disclosure in unnecessary detail.

Hereinafter, a description will be given with respect to an apparatus and method for writing a Wi-Fi profile including position information of searched APs when searching the APs, waking a Wi-Fi module up at only a position where an AP exists, and increasing a usage time of a portable terminal according to the present disclosure.

Figure 1:
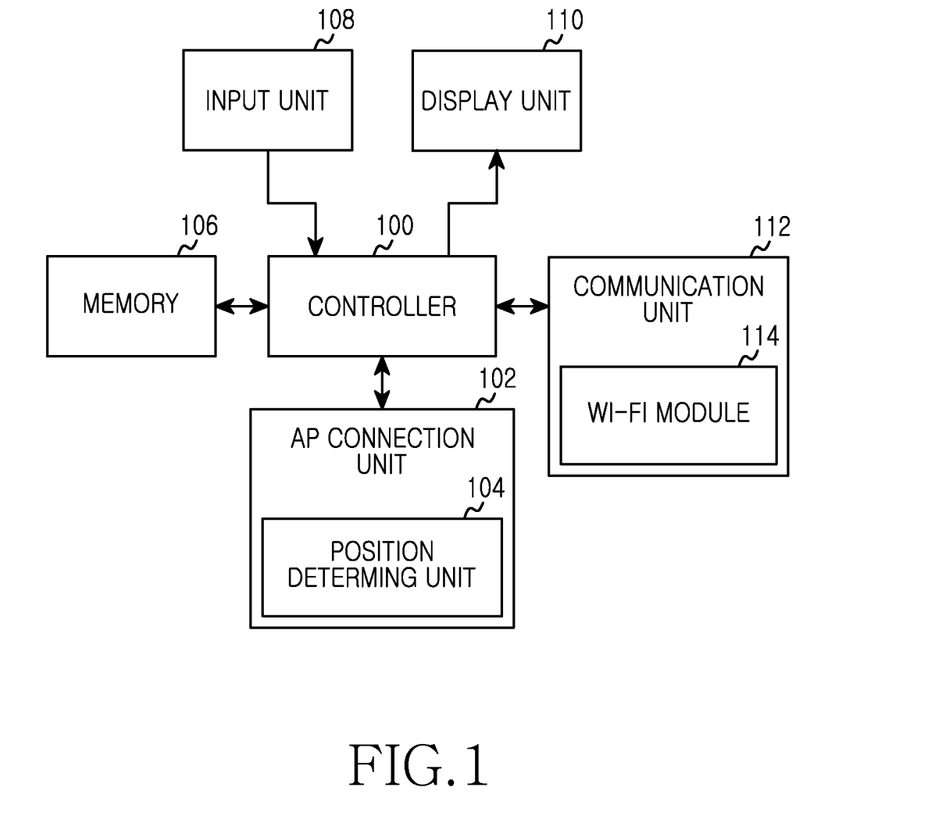
FIG. 1 is a block diagram illustrating a structure of a portable terminal for controlling an operation of a wireless LAN module and reducing power consumption according to the present disclosure.

FIG. 1 is a block diagram illustrating a structure of a portable terminal for controlling an operation of a wireless LAN module and reducing power consumption according to the present disclosure.

Referring to FIG. 1, the portable terminal may include a controller 100, an AP connection unit 102, a memory 106, an input unit 108, a display unit 110, and a communication unit 112. The AP connection unit 102 may include a position determining unit 104. The communication unit 112 may include a Wi-Fi module (e.g., a wireless LAN module) 114.

The controller 100 of the portable terminal controls an overall operation of the portable terminal. For example, the controller 100 processes and controls voice telephone call and data communication. In addition, the controller 100 controls an operation of the wireless LAN module 114 to reduce power consumption of the portable terminal. That is, the controller recognizes positions of APs and operates the wireless LAN module 114 only at positions where an AP exists to prevent power consumption due to an AP search process performed for connecting with the AP.

Therefore, the controller 100 stores a field indicating position information of APs in a Wi-Fi profile. The controller 100 stores position information of the corresponding AP together with the Wi-Fi profile when connecting with the AP.

The AP connection unit 102 controls an operation of the Wi-Fi module 114 under control of the controller 100.

That is, only when it is determined that the portable terminal is located at a position where an AP exists (i.e., it is determined that the portable terminal enters a coverage area of the AP), the AP connection unit 102 operates the Wi-Fi module 114 according to control of the controller 100. When it is determined that the portable terminal is located at a position where an AP does not exist (or the portable terminal goes out of a coverage area of an AP), the AP connection unit 102 ends an operation of the Wi-Fi module 114.

The position determining unit 104 of the AP connection unit 102 determines information about the position where the AP exists and provides the determined information to the AP connection unit 102.

That is, the position determining unit 102 determines position information of an AP corresponding to a current position from the Wi-Fi profile stored in the memory 106 and provides the determined position information to the AP connection unit 102. Or, the position determining unit 102 may provide position information of APs, which is stored in the Wi-Fi profile, to the AP connection unit 102 periodically.

The memory 106 preferably includes, for example, a Read Only Memory (ROM), a Random Access Memory (RAM), and a flash ROM. The ROM stores instructions (e.g., program code) by which the controller 100 and the AP connection unit 102 are processed and controlled, and a variety of reference data.

The RAM is a working memory of the controller 100 and stores temporary data that is generated while a variety of programs are performed. The flash ROM stores a variety of rewritable data, such as phonebooks, outgoing messages, incoming messages, and information about touch input points of a user. The memory 106 stores a Wi-Fi profile including position information of APs according to the present disclosure.

The input unit 108 includes numeral key buttons of '0' to '9' and a plurality of function keys such as a menu button, a cancel button, an OK button, a talk button, an end button, an Internet access button, a navigation key (or directional key) button, and a character input key. The input unit 108 provides key input data (e.g., a wireless LAN activation data, and the like) corresponding to a key pushed by the user to the controller 100.

The display unit 110 displays state information which is generated while the portable terminal is operated, character information, moving and still pictures, and so forth. The display unit 110 may be a color Liquid Crystal Display (LCD), Active Mode Organic Light Emitting Diode (AMOLED), and such. The display unit 110 includes a touch input device. When the display unit 110 is applied to a touch input type portable terminal, it may be used as an input device.

The communication unit 112 transmits and receives a Radio Frequency (RF) signal of data which is input and output through an antenna (not illustrated). For example, in a transmitting process, data to be transmitted is subject to a channel-coding process and a spreading process, and then the data is transformed to an RF signal. In a receiving process, the RF signal is received and transformed to a baseband signal, and the base-band signal is subject to a de-spreading process and a channel-decoding process, thereby restoring the data. The communication unit 112 includes the Wi-Fi module 114 according to the present disclosure. The communication unit 112 performs communication connection with APs. The communication unit 112 may include a GPS module for receiving position information of the portable terminal.

The function of the AP connection unit 102 may be performed by the controller 100 of the portable terminal. However, the present disclosure includes the controller 100 and the AP connection unit 102 which are exemplary configurations for the convenience of explanation and are not limited to a scope of the prevent disclosure. It will be understood by those skilled in the art that various changes in form and details may be made therein without departing from the spirit and scope of the present disclosure. For example, all of the described functions may be processed in the controller 100.

Figure 2:
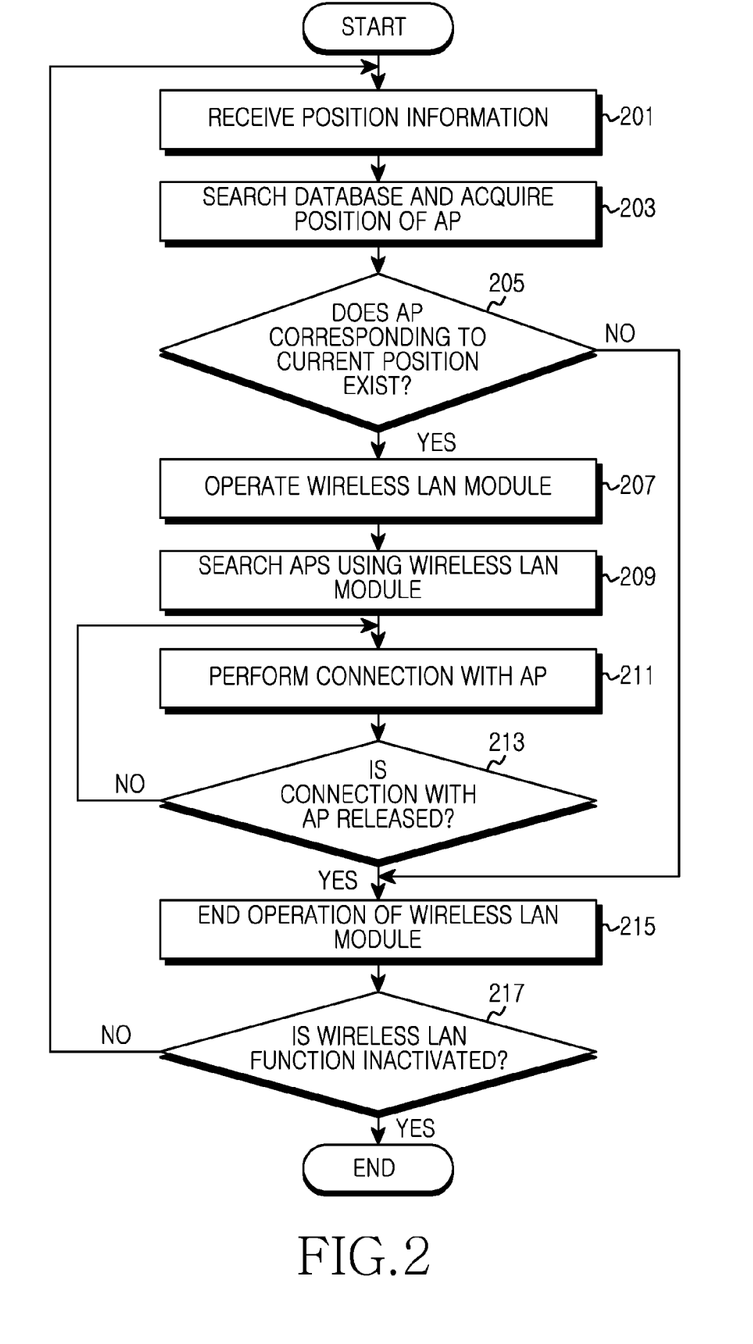
FIG. 2 is a flowchart illustrating a process of controlling an operation of a wireless LAN module in a portable terminal according to an embodiment of the present disclosure.

FIG. 2 is a flowchart illustrating a process of controlling an operation of a wireless LAN module in a portable terminal according to an embodiment of the present disclosure.

Referring to FIG. 2, the portable terminal determines whether to receive a satellite signal through a GPS module in block 201. Herein, the portable terminal may determine whether to perform an operation of a wireless LAN module according to its own position.

If the portable terminal does not receive the satellite signal through the GPS module in block 201, it repeats block 201 and performs the process of receiving a satellite signal for determining its own position again.

Alternatively, if the portable terminal receives the satellite signal through the GPS module in block 201, it determines its own current position.

The portable terminal proceeds to block 203, searches a database, and acquires a position of an AP. Herein, the portable terminal stores position information of respective APs. The portable terminal periodically determines APs which exist around the terminal (i.e., APs that have a coverage area that includes the location of the terminal).

The portable terminal proceeds to block 205 and determines whether an AP exists around the terminal.

If it is determined that the AP does not exist around the terminal in block 205, the portable terminal proceeds to block 215 and ends an operation of a wireless LAN module.

Alternatively, if it is determined that an AP exists around the terminal in block 205, the portable terminal proceeds to block 207 and operates the wireless LAN module capable of performing connection with the AP.

The portable terminal proceeds to block 209 and searches an AP using the wireless LAN module operated in block 207. The portable terminal proceeds to block 211 and performs connection with the searched AP. Herein, the AP searched in block 209 exists at the same position as that of the portable terminal. The portable terminal operates the wireless LAN module to reduce unnecessary power consumption only when determining the AP which exists at the same position as that of the portable terminal.

The portable terminal which performs the connection with the AP may perform data communication through the AP.

The portable proceeds to block 213 and determines whether the connection with the AP is released.

If it is determined that the connection with the AP is not released in block 213, the portable terminal performs the processing from block 211 again.

Alternatively, if it is determined that the connection with the AP is released in block 213, the portable terminal proceeds to block 215 and ends the operation of the wireless LAN module. The portable terminal proceeds to block 217 and determines whether a wireless LAN function is inactivated by a user. If the connection with the AP is released or an AP is not searched, a conventional portable terminal operates in a power save mode for being woken up periodically and searching signals of APs. However, the portable terminal according to the present disclosure ends the operation of the wireless LAN module to reduce power consumption in the power save mode.

If the wireless LAN function is not inactivated in block 217, the portable terminal performs the processing from block 201 again and operates the wireless LAN module only when an AP exists around the terminal.

Alternatively, if the wireless LAN function is inactivated in block 217, the portable terminal ends the algorithm of FIG. 2.

Figure 3:
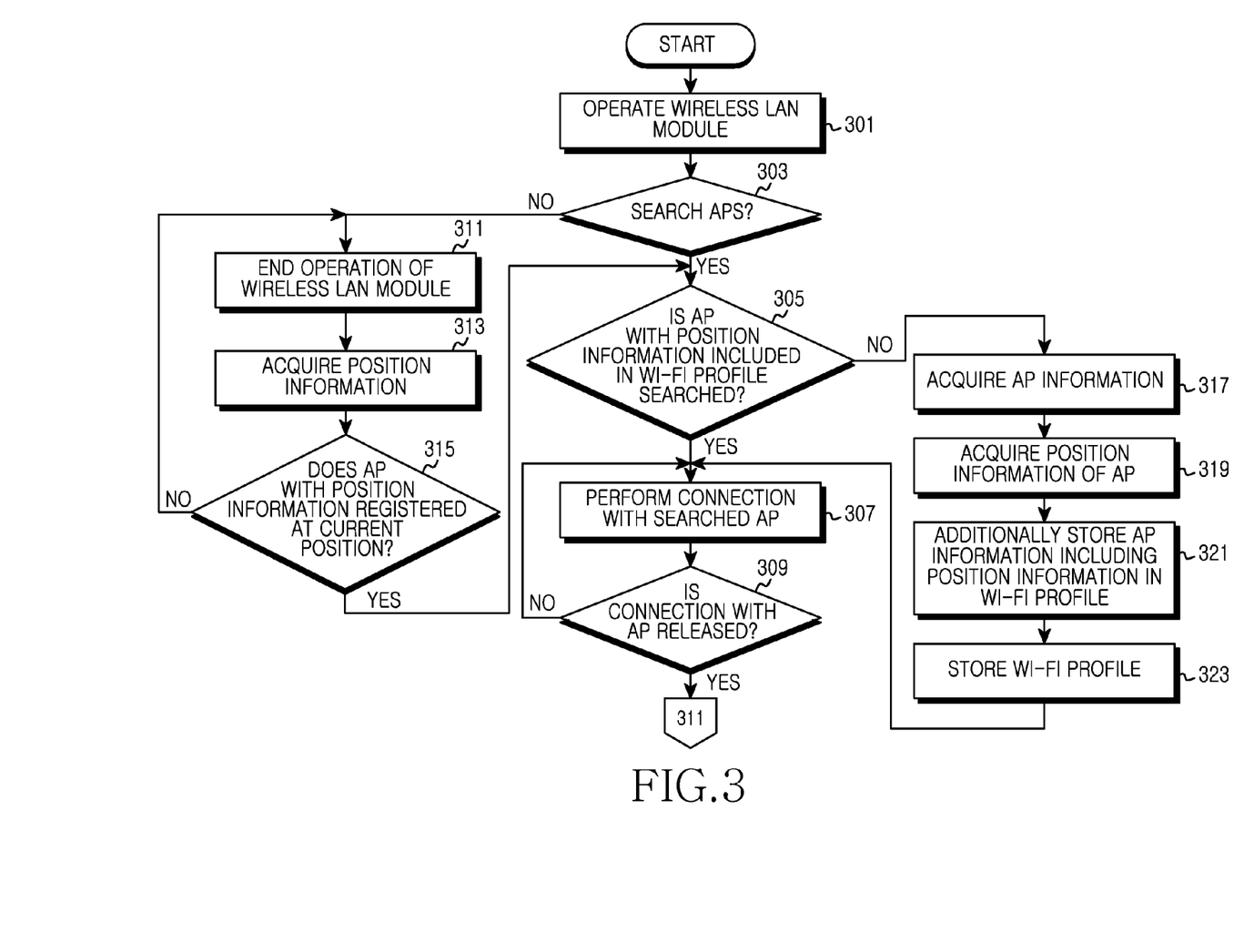
FIG. 3 is a flowchart illustrating a process of controlling an operation of a wireless LAN module in a portable terminal according to another embodiment of the present disclosure.

FIG. 3 is a flowchart illustrating a process of controlling an operation of a wireless LAN module in a portable terminal according to another embodiment of the present disclosure.

Referring to FIG. 3, the portable terminal operates a wireless LAN module in block 301. The portable terminal proceeds to block 303 and determines whether to search APs through the wireless LAN module.

If the portable terminal does not search the APs in block 303, it proceeds to block 311 and ends the operation of the wireless LAN module. The portable terminal proceeds to block 313 and acquires position information for determining a position thereof.

The portable terminal proceeds to block 315 and determines whether an AP registered at a current position exists.

If an AP registered at the current position does not exist in block 315, the portable terminal performs the processing from block 311 again to end the operation of the wireless LAN module.

Alternatively, if an AP registered at the current position exists in block 315, the portable terminal proceeds to block 305 and determines whether to search APs with position information included in a Wi-Fi profile. Herein, information associated with APs which were connected with the portable terminal is listed and stored in the Wi-Fi profile. If the portable terminal enters an area of the APs with the position information registered in the Wi-Fi profile again, the terminal is connected with the corresponding AP automatically.

If the portable terminal searches the APs in block 303, it performs the processing from block 305.

If the portable terminal searches the AP with the position information included in the Wi-Fi profile in block 305, the terminal proceeds to block 307 and performs connection with the AP. The portable terminal searches a plurality of APs with the position information included in the Wi-Fi profile. The portable terminal may select an AP with the best strength of a received signal and may connect with the selected AP.

The portable terminal proceeds to block 309 and determines whether the connection with the AP is released.

If the connection with the AP is not released in block 309, the portable terminal performs the processing from block 307 again.

Alternatively, if the connection with the AP is released in block 309, the portable terminal performs the processing from block 311 again.

Alternatively, if the portable terminal searches an AP with the position information which is not included in the Wi-Fi profile in block 305, the terminal proceeds to block 317 and acquires AP information (e.g., an AP name). The portable terminal proceeds to block 319 and acquires the position information of the searched AP. The portable terminal may add a field including position information of APs when writing the profile and may manage the position information of the respective APs.

The portable terminal proceeds to block 321 and additionally stores the AP information including the position information in the Wi-Fi profile. The portable terminal proceeds to block 323 and stores the written Wi-Fi profile.

The portable terminal proceeds to the processing from block 307 and performs the connection with the searched AP again.

Figure 4A:
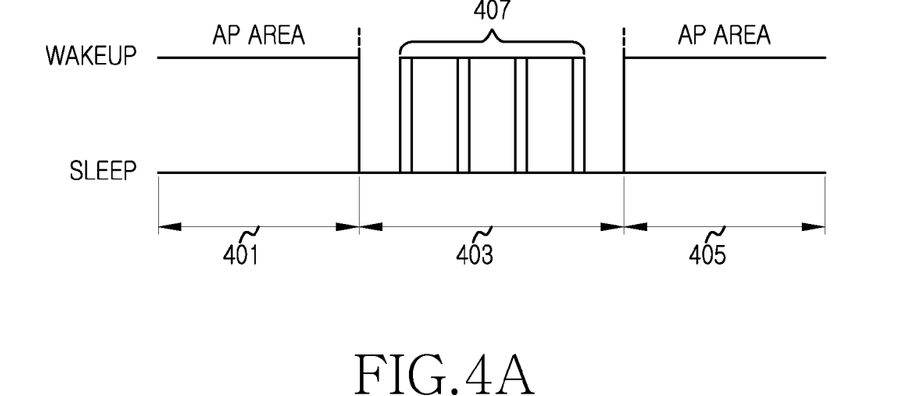
FIG. 4A is a waveform chart illustrating power consumption according to an AP search in a conventional portable terminal.
Figure 4B:
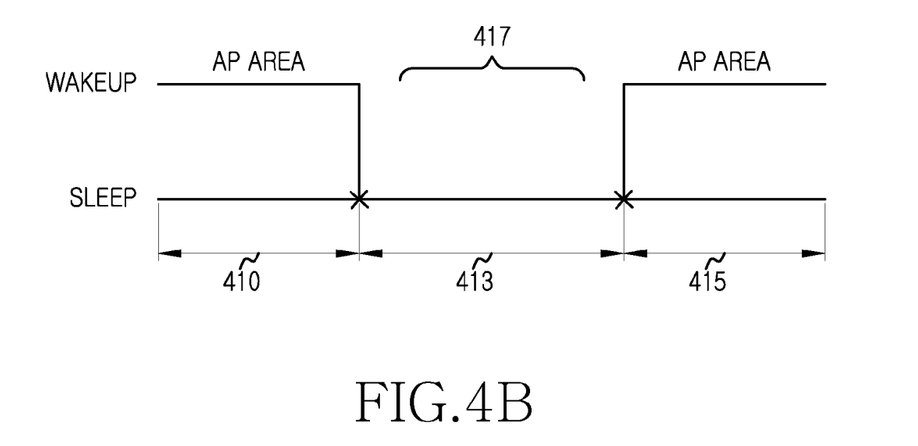
FIG. 4B is a waveform chart illustrating power consumption according to an AP search in a portable terminal according to the present disclosure.

FIG. 4 is a waveform chart illustrating power consumption according to AP searches of a conventional portable terminal and a portable terminal according to the present disclosure.

FIG. 4A is a waveform chart illustrating power consumption according to an AP search of a conventional portable terminal.

Referring to FIG. 4A, it is possible for the portable terminal to move to three areas. That is, the portable terminal moves to two areas 401 and 405 where APs exist and one area 403 where an AP does not exist.

The portable terminal changes a wireless LAN module from a sleep state to a wakeup state in the areas 401 and 405 where the APs exist. The portable terminal searches for an AP which exists in the corresponding area and connects with the searched AP.

However, if the portable terminal enters the area 403 where an AP does not exist, the portable terminal performs a process of searching APs which exist around the terminal to perform connection with the searched AP. At this time, the portable terminal enters a power save mode 407 for searching APs at intervals of a certain time.

FIG. 4B is a waveform chart illustrating power consumption according to an AP search in a portable terminal according to the present disclosure.

Referring to FIG. 4B, it is possible to the portable terminal to move to three areas. That is, the portable terminal moves to two areas 410 and 415 where APs exist and one area 413 where an AP does not exist. Also, the portable terminal writes a Wi-Fi profile when connecting with APs and additionally stores position information of the APs in the Wi-Fi profile.

In general, the portable terminal changes a wireless LAN module from a sleep state to a wakeup state in the areas 410 and 415 where the APs exist and searches for an AP which exists in the corresponding area. The portable terminal enters a power save mode in the area 413 where an AP does not exist and performs a process of searching APs at intervals of a certain time to reduce power consumption.

However, if it is determined that the portable terminal according to the present disclosure enters the area 413 where an AP does not exist using the position information of the AP, it ends an operation of the wireless LAN module, which is for AP connection, (i.e., change the wireless LAN module from a wakeup state to a sleep state 417) to reduce power consumption in the power save mode.

Figure 5:
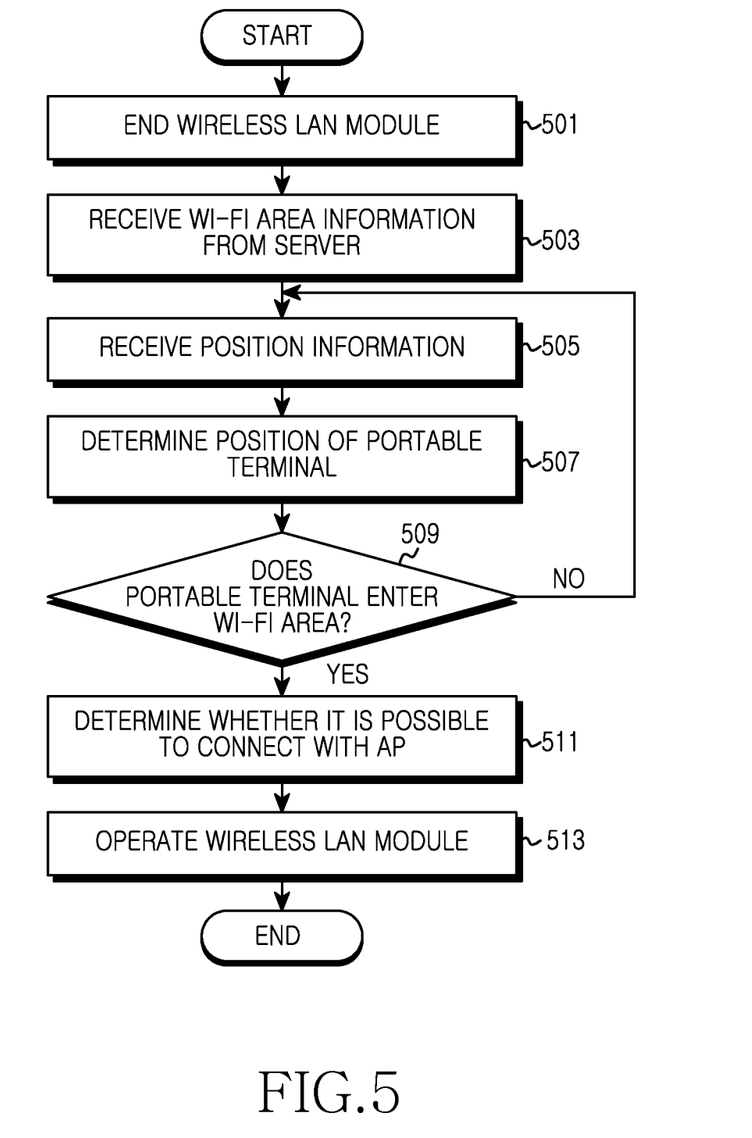
FIG. 5 is a flowchart illustrating a process of controlling an operation of a wireless LAN module in a portable terminal according to another embodiment of the present disclosure.

FIG. 5 is a flowchart illustrating a process of controlling an operation of a wireless LAN module in a portable terminal according to another embodiment of the present disclosure.

Referring to FIG. 5, the portable terminal controls an operation of a wireless LAN module using information about hot spot areas.

First, the portable terminal maintains the wireless LAN module at an off state in block 501 to prevent power consumption according to an operation of the wireless LAN module.

The portable terminal proceeds to block 503 and receives Wi-Fi area information from a server which manages hot spot areas. The portable terminal proceeds to block 505 and receives position information through a satellite signal receiving module.

The portable terminal proceeds to block 507 and determines its own current position using position information received in block 505. The portable terminal compares the determined current position with the position information received from the server and determines whether to move to a hot spot area.

That is, the portable terminal proceeds to block 509 and determines whether to enter the hot spot area capable of performing WiFi connection using the determined current position.

If it is determined that the portable terminal does not enter the hot spot area in block 509, it performs the processing from block 505 again.

Alternatively, if it is determined that the portable terminal enters the hot spot area, it proceeds to block 511 and determines that it is possible to connect with an AP of a hot spot area around the portable terminal, The portable terminal proceeds to block 513, operates the wireless LAN module, and performs connection with the AP.

Thereafter, the portable terminal ends the algorithm of FIG. 5.

As described above, the present disclosure minimizes power consumption of a portable terminal which enters a power save mode in an AP search process. The present disclosure may increase usage time of a portable terminal by writing a Wi-Fi profile including position information of searched APs when searching the APs and waking a Wi-Fi module up only at a position where an AP exists.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A mobile terminal for reducing power consumption, the mobile terminal comprising:
   a memory configured to store first information containing at least one position information of at least one AP;
   a wireless LAN module configured to perform a connection with an AP; and
   a controller configured to:
      determine whether the mobile terminal is currently positioned within a coverage of the stored at least one position information by comparing a current location of the mobile terminal with the stored at least one position information;
      inactivate the wireless LAN module if the controller determines that the mobile terminal is currently positioned outside the coverage; and
      activate the wireless LAN module if the controller determines that the mobile terminal is currently positioned outside the coverage and the connection with the at least one AP is maintained.

2. The mobile terminal of claim 1, wherein the controller is configured to inactivate the wireless LAN module if the mobile terminal is positioned outside the stored coverage of the connected AP and the connection with the connected AP is released.

3. The mobile terminal of claim 1, wherein the controller is configured to control the wireless LAN module to maintain the activated state if the mobile terminal is positioned within the stored coverage of the connected AP and the connection with the selected connected AP is released.

4. The mobile terminal of claim 1, wherein the at least one position information of at least one AP is received from a server.

5. The mobile terminal of claim 1, wherein the at least one position information of at least one AP is generated using a position information received by a GPS module of the mobile terminal.

6. The mobile terminal of claim 1, wherein the memory further configured to store second information containing information of at least one AP that was previously connected, and
wherein the controller is configured to determine whether information of the connected AP having the coverage is included in the stored second information, and to add the information of the connected AP to the second information if the information of the connected AP having the coverage is not included in the stored second information.

7. The mobile terminal of claim 6, the controller configured further to control the wireless LAN module to search the APs that exist around the mobile terminal using the stored first information.

8. The mobile terminal of claim 1, the controller configured further to manage connection information of at least one connected AP with the position information of the AP.

9. The mobile terminal of claim 8, wherein a first AP that was previously connected is displayed in a different state from a second AP that has not been connected.

10. The mobile terminal of claim 8, wherein the controller further is configured to identify a prior connection status of at least one searched AP.

11. A method of reducing power consumption in a mobile terminal, the method comprising:
storing first information containing at least one position information of at least one AP;
determining whether the mobile terminal is currently positioned within a coverage of the stored at least one position information by comparing a current location of the mobile terminal with the stored at least one position information;
inactivating the wireless LAN module if the controller determines that the mobile terminal is currently positioned outside the coverage; and
activating the wireless LAN module if the controller determines that the mobile terminal is currently positioned outside the coverage and the connection with the at least one AP is maintained.

12. The method of claim 11, further comprising controlling the wireless LAN module to inactivate the wireless LAN module if the mobile terminal is positioned outside the stored coverage of the connected AP and the connection with the connected AP is released.

13. The method of claim 11, further comprising controlling the wireless LAN module to maintain the activated state if the mobile terminal is positioned within the stored coverage of the connected AP and the connection with the selected connected AP is released.

14. The method of claim 11, wherein the at least one position information of at least one AP is received from a server.

15. The method of claim 11, wherein the at least one position information of at least one AP is generated using a position information received by a GPS module of the mobile terminal.

16. The method of claim 11, further comprising:
storing second information containing information of at least one AP that was previously connected, and
determining whether information of the connected AP having the coverage is included in the stored second information, and to adding the information of the connected AP to the second information if the information of the connected AP having the coverage is not included in the stored second information.

17. The method of claim 16, further comprising searching the APs that exist around the mobile terminal using the stored first information.

18. The method of claim 11, further comprising managing connection information of at least one connected AP with the position information of the AP.

19. The method of claim 18, wherein a first AP that was previously connected is displayed in a different state from a second AP that has not been connected.

20. The method of claim 18, further comprising identifying a prior connection status of at least one searched AP.

* * * * *